United States Patent [19]

Hindmarsh et al.

[11] E Patent Number: Re. 33,494

[45] Reissued Date of Patent: Dec. 18, 1990

[54] PICK HOLDING ARRANGEMENTS

[75] Inventors: Leslie W. Hindmarsh; Robert G. Knight; Gerald J. Sanders, all of Nuneaton, United Kingdom

[73] Assignee: Santrade Ltd., Lucerne, Switzerland

[21] Appl. No.: 184,960

[22] Filed: Apr. 19, 1988

Related U.S. Patent Documents

Reissue of:

[64] Patent No.: 4,603,911
Issued: Aug. 5, 1986
Appl. No.: 587,224
Filed: Mar. 7, 1984

[30] Foreign Application Priority Data

Mar. 10, 1983 [GB] United Kingdom ..... 8306641

[51] Int. Cl.[5] ..... E21C 35/18

[52] U.S. Cl. ..... 299/91; 299/86

[58] Field of Search ..... 175/410, 354, 371, 372; 299/86, 91, 92

[56] References Cited

U.S. PATENT DOCUMENTS

| | | | |
|---|---|---|---|
| 1,747,907 | 2/1930 | Reed | 175/354 |
| 1,792,604 | 2/1931 | Reed | 175/372 |
| 3,307,645 | 3/1967 | Hildebrandt | 175/372 |
| 3,512,838 | 5/1970 | Kniff | 299/92 |
| 4,201,421 | 5/1980 | Den Besten et al. | 299/86 |
| 4,302,053 | 11/1981 | Roepke et al. | 299/86 |
| 4,489,986 | 12/1984 | Dziak | 299/86 |

FOREIGN PATENT DOCUMENTS 2024287 1/1980 United Kingdom .

*Primary Examiner*—Bruce M. Kisliuk
*Attorney, Agent, or Firm*—Burns, Doane, Swecker & Mathis

[57] ABSTRACT

A cutter pick assembly comprises a point attack cutter pick rotatably mounted in a pick box through a sleeve in a bore. In front of the sleeve a hardened metal thrust and seal ring is mounted surrounding the forward end of the pick shank. The ring has a front face which engages in a recess in a shoulder of the pick and the ring both supports the pick against rearwardly directed cutting forces and provides a sufficiently close fit with the pick and the pick box bore to limit passage into the bore of foreign matter that may interfere with rotation of the pick in use. The thrust ring is retained axially in the bore by a spring clip and a further spring clip holds the pick axially in the sleeve, the latter being trapped in the bore by the thrust ring.

10 Claims, 1 Drawing Sheet

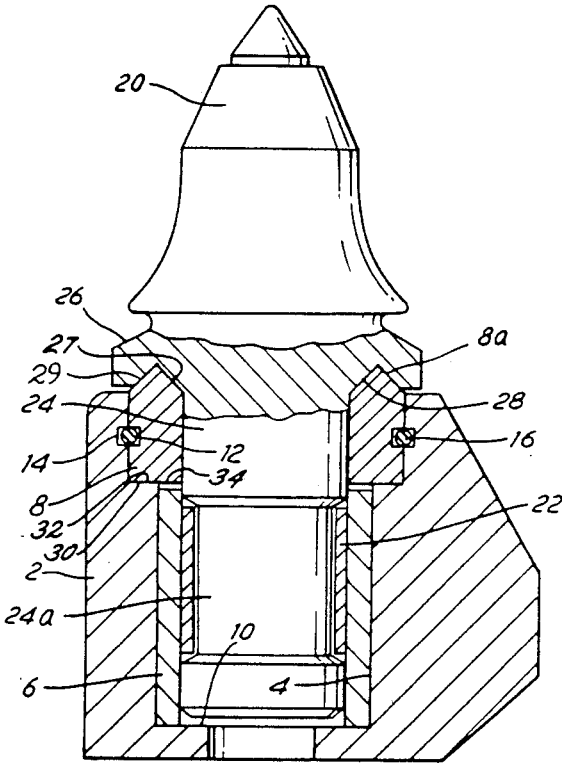
20
26
27
29
24
14
8
32
30
2
24a
6
10
4
8a
28
16
12
34
22

PICK HOLDING ARRANGEMENTS

Matter enclosed in heavy brackets [ ] appears in the original patent but forms no part of this reissue specification; matter printed in italics indicates the additions made by reissue.

BACKGROUND AND OBJECTS OF THE INVENTION

This invention relates to holding arrangements for cutting picks, particularly but not necessarily exclusively point attack picks, which are intended to be free to rotate in use. It relates to rotatable cutter picks themselves and to assemblies of other picks with their holding arrangements.

To provide for rotatability it is known to provide a pick with a cylindrical shank fitting freely in a cylindrical bore of a pick box, which may be sleeved to make rotation easier. These picks are usually employed in the severe conditions of mining and it is found that the freedom of a pick to rotate in the bore is impaired by build-up of foreign matter in the bore. As a result the working life of the pick will be considerably reduced because wear is concentrated on only a portion of the cutting tip.

According to one aspect of the invention there is provided an arrangement for holding a cutter pick comprising a pick box having a bore and sleeve receiving a shank of the pick lining at least a part of the length of said bore, the sleeve being rotatable in the bore to permit rotation of the pick about a longitudinal axis, a thrust ring at the front end of the bore being arranged to fit closely to the tool and the bore so as to impede the passage of foreign matter into the bore, said ring having an end face to support the pick against rearward axial forces.

According to another aspect of the invention, there is provided a cutter pick assembly comprising a point attack cutter pick rotatably mounted in a sleeved bore of a pick box, the forward end of said bore being substantially closed against the ingress of foreign matter by a metal thrust and seal ring closely fitting the pick and the pick box and having a forward annular face for supporting the pick against rearwardly directed cutting forces.

According to a further aspect of the invention, there is provided a point attack cutter pick comprising a cylindrical shank having an annular recess receiving a spring clip for retaining the pick shank axially in a bore of a sleeve and having a radially extending skirt at the forward end of the shank with a rearwardly directed recess for engagement by a thrust and seal ring supporting the pick against rearwardly directed cutting forces.

BRIEF DESCRIPTION OF THE DRAWING

By way of example, the accompanying drawing illustrates an embodiment of the invention in axial section.

DETAILED EMBODIMENT OF A PREFERRED EMBODIMENT OF THE INVENTION

The drawing shows a pick box 2 with a cylindrical bore 4 in which a sleeve 6 is held axially between a front thrust ring 8 and an annular rear wall 10 of the bore. To hold the thrust ring axially in the pick box, the ring and the bore have annular recesses 12, 14 that come into registration with each other when the thrust ring is inserted, and a spring clip 16 that is resiliently deformable into the thrust ring recess during insertion but then springs out to engage both recesses.

The front end face **8*a* of the thrust ring tapers forwardly to define a V-shaped cross-sectional form with the apex projecting forwards. That is, a first portion 27 of the end face 8a extends radially outwardly and axially outwardly and converges forwardly relative to a second portion 29** which extends radially inwardly and axially forwardly. Both the sleeve and the thrust ring are of a hard metallic material, e.g. hardened steel.

A point attack coal-cutter pick 20 is inserted into the bore to seat in the sleeve 6 and be held there frictionally by a spring clip 22 located on a smaller diameter intermediate portion 24a of the pick shank 24. The axial retention of the thrust ring also traps the sleeve 6 in the bore by means of a radially extending portion 34 of a rear end face 30 of the ring which extends into the path of the sleeve.

The annular front shoulder 26 of the pick has a rear face 28 which includes a recess-shaped complementary to the front face of the thrust ring and these two faces normally fit closely togehther, as do the inner peripheral face of the thrust ring and the opposed periphery of the pick shank. The thrust ring therefore acts not only to react the rearwardly directed cutting forces on the pick due to engagement of the rear end face 30 of the ring with a radial shoulder 32 of the bore, but also as a seal restricting the passage of foreign matter, in particular abrasive particles, into the bore. The rear of the bore may be sealed by a snap-in cap (not shown) which can be removed to allow a driver (not shown) to be inserted when the pick is replaced.

In use, the pick is intended to operate in the usual manner of a point attack pick, rotating randomly about its axis as it cuts in order to extend its useful life. For this purpose the sleeve is freely rotatable in the pick box bore, although rotation between the shank and the sleeve is also not excluded. The thrust ring 8 may be rotatably fixed to the pick box or may be left free to rotate in the box. A gap between the thrust ring and the sleeve ensures that its freedom to rotate is not restrained by axial forces transmitted through the thrust ring.

Because the bore 4 is closed at the front by the thrust ring 8, the rotatability of the pick in use is less readily affected by the dirty conditions in which such picks are used and the life of the pick is thereby extended. At the same time, the choice of a hard material for the ring 8 ensures that it can be placed at the very front of the tool box bore where a seal is best effected and yet it is capable of withstanding the substantial axial forces generated during the cutting. The hardness of the thrust ring material also ensures that it has along operational life.

We claim:

1. A holding arrangement for a cutter pick of the type comprising a rearwardly open, forwardly tapering recess, said holding arrangement comprising:

a pick box containing a forwardly open bore defining a front-to-rear extending longitudinal axis and including a radial shoulder, a sleeve disposed within and lining at least a portion of said bore and sized to receive therein a shank of the pick, said sleeve being rotatable about said axis to permit rotation of the pick about said axis; and a thrust ring extending into a front end of said bore and retained therein against axial dislodgement, said thrust ring arranged to closely fit said pick and said bore to impede the passage of foreign matter into said bore, said thrust ring including a front end face and a rear radial surface bearing against said shoulder for resisting axial inward forces applied thereagainst by the pick during a cutting action, and a radially extending portion extending into the path of said sleeve for preventing axial dislodgement thereof, said front end face defined by a first portion extending radially outwardly and axially forwardly, and a second portion extending radially inwardly and axially forwardly, said first and second portions converging forwardly in V-shape to engage first and second forwardly converging surfaces of said recess formed in said pick.

2. An arrangement according to claim 1 including a resilient retaining ring acting between said thrust ring and said pick box for retaining said thrust ring against axial dislodgement from said bore.

3. An arrangement according to claim 2, wherein said retaining ring comprises a radially elastic annular clip disposed within an annular groove defined by radially aligned recesses in said thrust ring and said bore.

4. An arrangement according to claim 1, wherein said radial shoulder is situated between a front end of said sleeve and a front end of said pick box, said radial surface of said thrust ring being defined by a rear end face of said thrust ring, said radially extending portion of said thrust ring being defined by a portion of said end face projecting radially inwardly beyond said shoulder into radially overlying relationship with said sleeve.

5. An arrangement according to claim 1, wherein said thrust ring is rotatable about said axis.

6. An arrangement according to claim 1 including frictional retaining means disposed along an inside wall of said sleeve for engagement with the pick shank.

7. A cutting pick assembly comprising:

a point attack bit including a front cutting face, a rearwardly projecting shank, and a shoulder disposed between said cutting face and said shank, said shoulder including a rearwardly open, forwardly tapering recess defined by first and second forwardly converging surfaces, a pick box containing a forwardly open bore defining a front-to-rear extending longitudinal axis and including a radial shoulder disposed rearwardly of a front end of said bore, a sleeve disposed within said bore and lining a portion of said bore, said sleeve receiving said shank axially therein, said sleeve being rotatable about said axis to permit rotation of said pick about said axis, and a thrust ring extending into a front end of said bore and retained therein against axial dislodgement, said thrust ring arranged to closely fit said pick and said bore to impede the passage of foreign matter into said bore, said thrust ring including:

a front end face defined by a first portion extending radially outwardly and axially forwardly, and a second portion extending radially inwardly and axially forwardly, said first and second portions converging forwardly in V-shape to engage said first and second surfaces of said recess in said bit, and a rear end face bearing against said shoulder of said bore to resist axial forces applied against said thrust ring by said pick during a cutting operation, and a radially extending portion extending in front of said sleeve to prevent axial dislodgement thereof.

8. An assembly according to claim 7 including a retainer acting between said shank and said sleeve for axially retaining said shank in place while permitting rotation thereof about said axis.

*9. A cutting pick assembly comprising:*

*a point attack bit including a front cutting face, a rearwardly projecting cylindrical shank, and a shoulder disposed between said cutting face and said shank, said shoulder including a rearwardly open, forwardly tapering recess defined by first and second forwardly converging frusto-conical surfaces,*

*a pick box containing a forwardly open bore defining a front-to-rear extending longitudinal axis for receiving said shank axially therein, one of said frusto-conical surfaces extending from a forward end of said cylindrical shank,*

*means retaining said shank in said bore and permitting rotation of said pick about said axis,*

*said pick box carrying a face surrounding a front end of said bore, said face defined by a first frusto-conical portion extending radially outwardly and axially forwardly, and a second frusto-conical portion extending radially inwardly and axially forwardly, said first and second frusto-conical portions converging forwardly in V-shape to engage said first and second frusto-conical surfaces of said recess in said bit, to impede the passage of foreign matter into said bore.*

*10. A point attack bit adapted to be mounted in a pick box, said point attack bit comprising a front cutting face, a rearwardly projecting cylindrical shank, and a shoulder disposed between said cutting face and said shank, said shoulder including a rearwardly open, forwardly tapering recess defined by first and second forwardly converging frusto-conical surfaces, one of said frusto-conical surfaces extending from a forward end of said cylindrical shank, said frusto-conical surfaces adapted to engage corresponding surfaces on the pick box to impede the passage of foreign matter.*

* * * * *